(12) United States Patent
Harrington

(10) Patent No.: US 10,093,494 B2
(45) Date of Patent: *Oct. 9, 2018

(54) VERTICALLY STORED TELESCOPING LIP LEVELER

(71) Applicant: Nordock, Inc., Bowmanville, Ontario (CA)

(72) Inventor: David Harrington, Port Hope (CA)

(73) Assignee: Nordock, Inc., Bowmanville/Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,273

(22) Filed: Nov. 23, 2016

(65) Prior Publication Data

US 2017/0073177 A1    Mar. 16, 2017

Related U.S. Application Data

(63) Continuation of application No. 14/303,384, filed on Jun. 12, 2014, now Pat. No. 9,517,902.

(51) Int. Cl.
*B65G 69/28* (2006.01)
(52) U.S. Cl.
CPC .............................. *B65G 69/2829* (2013.01)
(58) Field of Classification Search
CPC ............... B65G 69/28; B65G 69/2805; B65G 69/2811; B65G 69/2817; B65G 69/2823; B65G 69/2829
USPC .................................................. 14/71.1, 71.3
See application file for complete search history.

(56) References Cited

U.S. PATENT DOCUMENTS

| 2,984,072 | A | * | 5/1961 | Born | B66F 3/46 |
| | | | | | 254/89 H |
| 3,137,017 | A | | 6/1964 | Pfleger | |
| 3,235,895 | A | | 2/1966 | Wallace | |
| 3,296,722 | A | * | 1/1967 | Curlett | E01C 19/008 |
| | | | | | 172/4.5 |
| 3,846,860 | A | * | 11/1974 | Kummerman | B63B 27/143 |
| | | | | | 14/71.1 |
| 3,997,932 | A | | 12/1976 | Artzberger | |
| 4,224,709 | A | | 9/1980 | Alten | |
| 4,398,315 | A | | 8/1983 | Driear | |
| 4,455,703 | A | | 6/1984 | Fromme | |
| 4,551,877 | A | | 11/1985 | Alten | |
| 4,662,021 | A | | 5/1987 | Hagen | |

(Continued)

*Primary Examiner* — Thomas B Will
*Assistant Examiner* — Katherine J Chu
(74) *Attorney, Agent, or Firm* — Jeffrey S. Sokol

(57) ABSTRACT

The present invention is a vertically stored dock leveler with a telescoping lip that selectively extends and retracts through a range positions relative to the deck. The lip is held and guided by a deck frame carriage. When the deck is raised and lowered, the lip is extended and retracted by an electro-hydraulic control system. When the deck reaches a preselected incline position, the lip is fully extended. Sensors on the underside of the deck determine the incline position of the deck and when the lip is retracted. The leveler is then lowered until the lip engages and rests on the bed of the trailer. Similarly, when the deck is raised for storage and reaches the preselected incline position, the lip is fully retracted prior to returning to its stored position. The telescoping lip is selectively moveable to a range of partially extended position to facilitate end loading a trailer.

8 Claims, 13 Drawing Sheets

(56) References Cited

U.S. PATENT DOCUMENTS

| | | |
|---|---|---|
| 4,670,928 A | 6/1987 | Alten |
| 4,776,052 A | 10/1988 | Delgado |
| 4,998,718 A | 3/1991 | Arens |
| 5,001,799 A | 3/1991 | Alexander |
| 5,396,676 A | 3/1995 | Alexander |
| 5,450,643 A | 9/1995 | Warner |
| 5,475,888 A | 12/1995 | Massey |
| 5,481,773 A | 1/1996 | Alten |
| 5,560,063 A | 10/1996 | Alten |
| 5,586,355 A | 12/1996 | Metz |
| 6,205,606 B1 * | 3/2001 | Zibella ............... B65G 69/2835 14/69.5 |
| 6,834,409 B2 | 12/2004 | Gleason |
| 7,013,519 B2 | 3/2006 | Gleason |
| 7,793,596 B2 * | 9/2010 | Hirtenlehner ............. B60R 3/02 105/443 |
| 8,800,086 B1 | 8/2014 | Borgerding |
| 2010/0269273 A1 * | 10/2010 | Proffitt ................. B65G 69/003 14/71.3 |
| 2011/0258788 A1 | 10/2011 | Ion |
| 2012/0030887 A1 * | 2/2012 | Corboy ................... B63B 27/14 14/71.3 |
| 2015/0047132 A1 * | 2/2015 | Sveum ............. B65G 69/2882 14/71.1 |
| 2015/0151834 A1 * | 6/2015 | Cox ...................... B64C 25/405 701/3 |

* cited by examiner

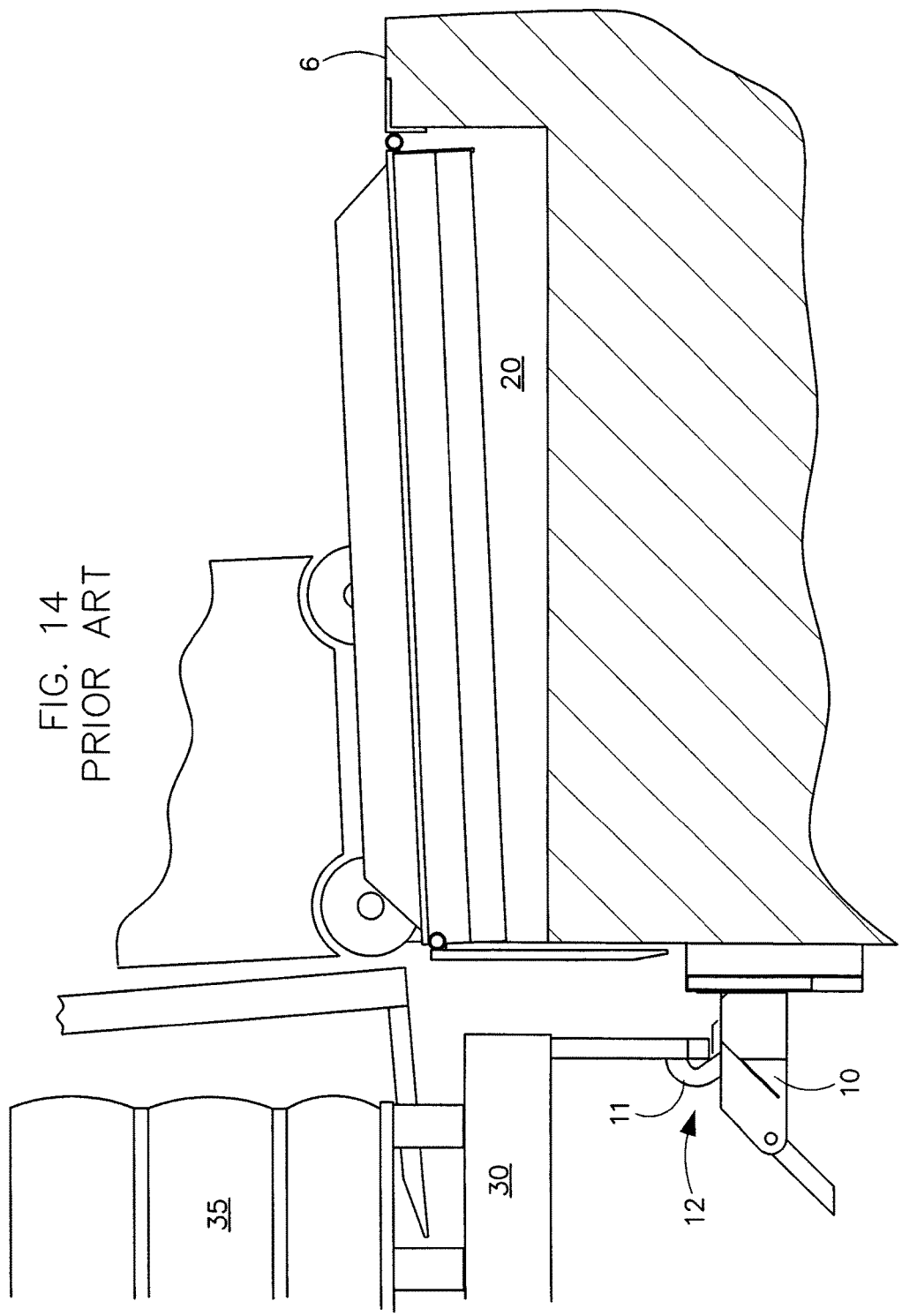

VERTICALLY STORED TELESCOPING LIP LEVELER

TECHNICAL FIELD OF THE INVENTION

This invention relates to a vertically stored dock leveler with a telescoping lip that is fully extended for normal loading of a trailer, partially extended to end load the trailer, and retracted for storage.

BACKGROUND OF THE INVENTION

Dock levelers are used to transfer goods between a building and a truck trailer. They bridge the gap between the building floor to the bed of the trailer or similar carrier. Levelers include a frame or support structure to mount it in a pit of a loading dock. The rear end of the leveler is hinged to the building floor. The opposite end of the leveler has an extendable lip plate that engages the trailer bed. A doorway is positioned over the loading dock and its pit. The doorway is opened to load and unload a trailer, and closed when the dock stall is not in use. Conventional levelers are designed to store in either a horizontal or vertical position. Horizontally stored levelers are adapted to move from a generally horizontal position where the upper surface of the deck is flush with the surface of the building floor to a second generally inclined position to provide a ramp between the bed of the truck and the dock floor. When stored in the pit, the door seals against the top of the loading dock deck. The door does not extend to the bottom of the pit. Hot or cold air, humidity, dust and insects can enter the building via the pit. Vertically stored levelers are adapted to move from a generally vertical stored position to a generally inclined position to provide a ramp between the bed of the truck trailer and the dock floor. When stored, these levelers are located entirely inside the building so that the overhead door can seal off the pit to seal the interior of the building from thermal losses, humidity, dust, insects, etc. Vertically stored levelers are particularly suited for docks handling food and other refrigerated goods.

Various mechanisms have been developed for extending and retracting the lip of a dock leveler during operation. Two common types are pivotally extending the lip and telescopically extending the lip. When the lip extends pivotally, the lip extends from its pendant stored position to its extended position when the ramp is raised or when the operator walks the ramp down. Examples of pivotally extended lips are disclosed in U.S. Pat. No. 3,137,017 to Pfleger, U.S. Pat. No. 3,997,932 to Artzberger, U.S. Pat. No. 4,398,315 to Driear, U.S. Pat. No. 5,475,888 to Massey, and U.S. Pat. Nos. 6,834,409 and 7,013,519 to Gleason, the disclosures of which are incorporated by reference. When the lip extends telescopically, the lip extends from its stored position under the deck of the leveler to its extended position. Examples of telescopically extended lips are disclosed in U.S. Pat. Nos. 5,001,799 and 5,396,676 to Alexander, U.S. Pat. No. 5,450,643 to Warner and U.S. Pat. No. 5,586,355 to Metz, the disclosures of which are incorporated by reference.

Conventional vertically stored levelers have a hinged lip. The lip fully extends to rest on a trailer bed when loading or unloading a trailer. When extended, the lip is flush with and relatively parallel to the deck of the leveler. When cargo has been loaded or unloaded, the deck is raised to remove the lip from the trailer. As the deck rises, the lip moves to a pendent position so that when the deck is vertically stored, the lip is roughly perpendicular to the deck.

A problem with conventional vertically stored dock levelers is end loading a trailer. The lip is extended up to two feet into the trailer. Cargo cannot be placed at the end of the trailer without setting the cargo on the lip of the leveler. Placing cargo on the lip inhibits raising the leveler to remove the lip from the trailer. Thus, to end load the trailer, the deck must be raised and lowered so that the lip hangs pendent to fit in a gap between end of the dock floor and the trailer bed as shown in FIG. 14. This extra step takes time. A worker must park and get off a forklift to operate the dock leveler. The deck has to be raised, and pneumatic cylinders must discharge to allow the hinged lip to hang pendent. Then the deck has to be lowered to a position that brings its front end even with the trailer bed. These additional steps reduce dock efficiency. They also cause additional wear and tear on the leveler, which increases the frequency of routine maintenance. If a dock worker does not wait for the lip to hang entirely pendent, the tip of the lip can strike, gouge or otherwise damage the trailer. In addition, when unloading an already end loaded trailer, the lip cannot be extended to bridge the gap between the trailer bed and dock floor. The cargo at the end of the trailer prevents the deployment of the lip. The cargo at the end of the trailer must first be unloaded without the use of the lip. The leveler is then raised and lowered to deploy the lip into the trailer to further unload the trailer.

Another problem with conventional vertically stored dock levelers during end loading is that the pendent lip does not bridge the gap between the trailer bed and dock floor. The exposed gap can allow a forklift wheel to inadvertently be driven or slip into this gap. Cargo can fall off the forklift and be damaged, and the time needed to lift the forklift out of the gap reduces dock efficiency. The exposed gap also poses a potential safety concern for dock workers who can inadvertently trip on or step into this gap. Goods, tools and other items can also fall through the gap to further reduce dock efficiency. Moving the lip to a pendant position also frequently interferes with the operation of the vehicle restraint securing the trailer to the loading dock. The restraint frequently needs to be disengaged to allow the lip to hang pendent. Disengaging the vehicle restraint allows inadvertent and unsafe movement of the truck while workers are still end loading the trailer.

A further problem with vertically stored levelers is controlling the movement of the deck relative to the movement of the hinged lip. The leveler must clear the overhead door. The deck should not be raised to its vertical position until the hinged lip moves to its pendent position. The total height of the leveler must be shorter than the height of the door opening. The total height of a vertically stored leveler with the lip extended can exceed 9 to 12 feet, which can exceed the height of the door opening, or impact ventilation ducts, piping, wiring, or other components in the interior of the loading dock. Although loading dock doors are designed to accommodate vertically stored levelers when the lip is pendent, they may not accommodate the leveler when its lip is extended. A leveler with an extended lip can strike and damage the overhead door or the components in the interior of the dock.

A still further problem with conventional dock levelers is keeping the controls and the wiring for the controls as simple as possible. Complicated control system wiring is difficult to install, and can result in installation and maintenance errors. Components that have to be wired a particular way are more complicated, and can lead to wires being inadvertently crossed.

A still further problem with conventional dock levelers is the use of limit switches to control the raising and lowering of the deck. The limit switches are typically placed at or near the perimeter of the doorway, which is an inherently busy area of a loading dock. The switches can be inadvertently bumped and result in a leveler malfunction.

The present invention is intended to solve these and other problems.

BRIEF DESCRIPTION OF THE INVENTION

The present invention pertains to a vertically stored dock leveler with a telescoping lip that selectively extends and retracts through a range positions relative to the deck. The lip is held and guided by a deck frame carriage. When the deck is raised and lowered, the lip is extended and retracted by an electro-hydraulic control system. When the deck reaches a preselected incline position, the lip is fully extended. Sensors on the underside of the deck determine the incline position of the deck and when the lip is retracted. The leveler is then lowered until the lip engages and rests on the bed of the trailer. Similarly, when the deck is raised for storage and reaches the preselected incline position, the lip is fully retracted prior to returning to its stored position. The telescoping lip is selectively moveable through a range of partially extended position to facilitate end loading a trailer.

One advantage of the present vertically stored leveler is loading dock efficiency. When loading a trailer, the lip is extended over the trailer bed up to two feet. When cargo is ready to be placed at the end of the trailer, the lip is partially retracted without removing it from the trailer so that only a few inches of the lip extends over the trailer bed. Similarly, when cargo at the end of the trailer is being unloaded, the lip is only partially extended a few inches into and over the trailer bed. The operation of the leveler does not waste time raising and lowering the deck to move the lip between pendent and extended positions. This improves dock efficiency and minimizes extra wear and tear on the leveler. In addition, the lip remains relatively in-line with the leveler deck, to minimize or avoid any risk of damage to the trailer to perform an end load.

Another advantage of the present vertically stored telescoping lip leveler is end loading safety. When cargo is being placed on or removed from the rear end of the trailer, the lip can be moved to a partially extended position so that only a few inches of the lip extends over the trailer bed. The lip bridges the gap between the dock and the trailer so that the forklift wheel will not inadvertently drop into the gap, which can cause cargo to fall off the forklift, and which requires the heavy forklift to be pulled from the gap. Workers also do not run the risk of inadvertently stepping into the gap. The deployment of the lip over the gap also prevent goods or debris from falling through the gap between the dock and the trailer during end loading and unloading. The restraining device remains engaged to capture the trailer RIG to prevent its inadvertent movement when dock workers are end loading.

A further advantage of the present vertically stored telescoping lip leveler is controlled movement of the deck and lip. When the deck is being lowered from storage and reaches the preselected inclined position, the lip automatically extends. Similarly, when the deck is being raised for storage and reaches the preselected inclined position, the lip automatically retracts. Unless the control system is overridden, the deck cannot be raised to its vertical stored position until the hinged lip moves to its retracted position. Similarly, unless the control system is overridden, the lip cannot be extended until the deck is lowered to the preselected incline position. This control helps ensure that the leveler clears and does not damage the overhead door or any ventilation ducts, piping, wiring, or other components in the interior of the loading dock.

A still further advantage of the present vertically stored telescoping lip leveler is control wiring simplicity. The position sensor is remarkably easy wire to the control system. The sensor works independent of how the input and out put wires are connected to the control system. Crossing the sensor wires will not result in operation error.

A still further advantage of the present vertically stored telescoping lip leveler is operation reliability. The position sensor is remarkably reliably and is installed at a location on the underside of the deck where it is unlikely to be inadvertently bumped in the busy work environment of a loading dock. Limit switches located at or near high traffic areas along the perimeter of the loading dock doorway are avoided.

Other aspects and advantages of the invention will become apparent upon making reference to the specification, claims and drawings.

BRIEF DESCRIPTION OF THE DRAWINGS

FIG. 14 is a side view of a conventional vertically stored dock leveler with a hinged lip hanging pendent to allow a forklift to end load a trailer with the forklift wheels approaching a gap between the trailer and dock floor.

DESCRIPTION OF THE PREFERRED EMBODIMENTS

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 1:
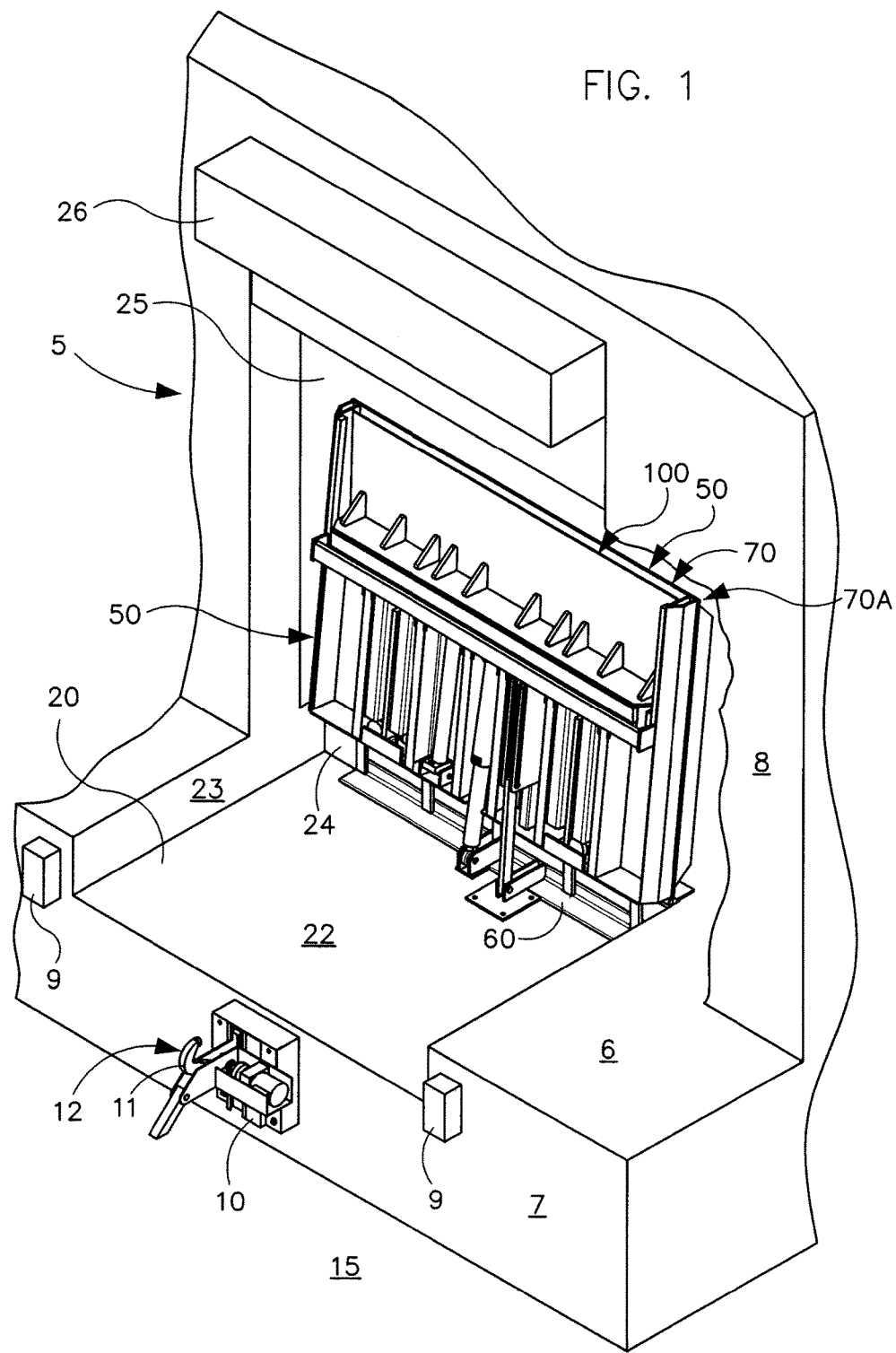
FIG. 1 is a perspective view of the outside of a loading dock building equipped with the present vertically stored dock leveler.

Loading docks 5 have a generally flat, horizontal, elevated floor surface 6 that extends from a generally vertical exterior front wall 7 into the interior of the building 8. The front wall 7 includes a vehicle restraint 10 with a restraining or hooking mechanism 11 that is selectively moved from a released position to a locked position 12. The front wall 7 also includes bumpers 9 to engage the trailer when it backs into the dock 5. The front wall 7 extends from the elevated dock floor 6 to the paved drive or ground surface 15 upon which the trailer travels. The loading dock 5 has a pit 20 of sufficient depth to accommodate a dock leveler when it is lowered as shown in FIG. 1. The pit 20 has a floor 22, opposed sidewalls 23, rear wall 24, and open front. The pit floor 22 is generally horizontal or slightly sloped for drainage, and is spaced a desired distance from the dock floor 7. The pit walls 24 are generally vertical and normal to floor surfaces 6 and 22. The loading dock building 8 has a doorway 25 set back from the front wall 7 of the loading dock 5 and forward from the rear wall 24 of the pit 20. An overhead door 26 is used to selectively open and close the doorway 25. The vertically stored dock leveler is positioned at the rear of the pit 20 behind the doorway 25 and overhead door 26. The entire vertically stored leveler is inside the building 8 when the door 25 is closed. The overhead door seals against the frame of the doorway 25, pit sidewalls 23 and pit floor 22. The overhead door 26 seals the doorway 25 when the dock is not in use, and is opened by a dock worker when a trailer 30 backs up to the dock 5 for loading or unloading.

The loading dock 5 is designed to facilitate access to a trailer 30 of a truck or other carrier as shown in FIG. 5-8. The trailer 30 has a bed 32 upon which cargo items 35 are placed for transport. The trailer bed 32 is spaced above the road or drive surface 15 on which the trailer 30 travels. The dock floor 6 is spaced a desired distance above its adjacent driveway or approach 15 so that a trailer bed 32 is somewhat near the level of the dock floor 6 when the rear end of the trailer 30 backs up to the front 7 of the dock 5. The trailer 30 is secured to the front wall 7 by the restraining device 10 by selectively moving its restraining or hooking device 11 from a release position to a locked position 12 to capture the rear impact guard (RIG) 38 of the trailer. The pit floor 22 is elevated a desired height above the driveway 15, but could be even with or lower than the driveway depending on the particular circumstance without departing from the broad aspects of the invention. The height of the trailer bed 32 relative to the dock floor 6 depends on a variety of factors that include the particular trailer 30 involved and the weight of the cargo item or items 35 on the trailer. The trailer bed 32 rises and falls relative to the dock floor 6 as cargo items 35 are placed on or removed from the trailer 30.

The present invention relates to a vertically stored dock leveler generally indicated by reference number 50 and shown in FIGS. 1-4. The dock leveler 40 has a variety of components including a mounting frame assembly 60, a deck and lip assembly 70 with a telescoping lip assembly 90, and deck and lip positioning mechanisms 110 and 120. The components are robustly designed to support the weight of the deck and lip assembly 70 and the loads it is intended to carry when forklifts and the like carry cargo items 35 over the leveler 50. The components are generally made of industrial grade steel or materials of similar strength and durability. The components may be painted, coated or otherwise treated to inhibit rust or corrosion.

The mounting frame assembly 60 is located along the floor 22 and rear wall 24 of the pit 20. The frame assembly 60 has a rear end, and includes a base frame 61 that is bolted or otherwise rigidly anchored to the pit floor 22, and a vertical riser frame 65 that is similarly anchored to the pit rear wall 24. The base frame 61 spans the majority of the width of the pit 20. The riser frame 65 is located along the pit rear wall 24, and are preferably welded or otherwise rigidly secured to the rear end of the base frame 61. The riser frame 65 includes two or more vertical beams joined together by lower and upper mounting channels 62 and 66. The upper mounting channel 66 is aligned against and anchored to one or both of the top of the pit rear wall 24 and the dock floor 6. The riser 65 is rigidly secured to the upper mount 66 to firmly support a fixed tubular hinge or pivot mount 67 for pivotally supporting the deck and lip assembly 70. A pivot bracket 63 extends forward from to the base frame 61 to supportably receive a hydraulic deck drive cylinder spaced a predetermined distance from the rear wall 24 of the pit 20. The mounting frame 60 is preferably permanently attached to case in steel in the building floor at its rear pivot end.

Figure 3:
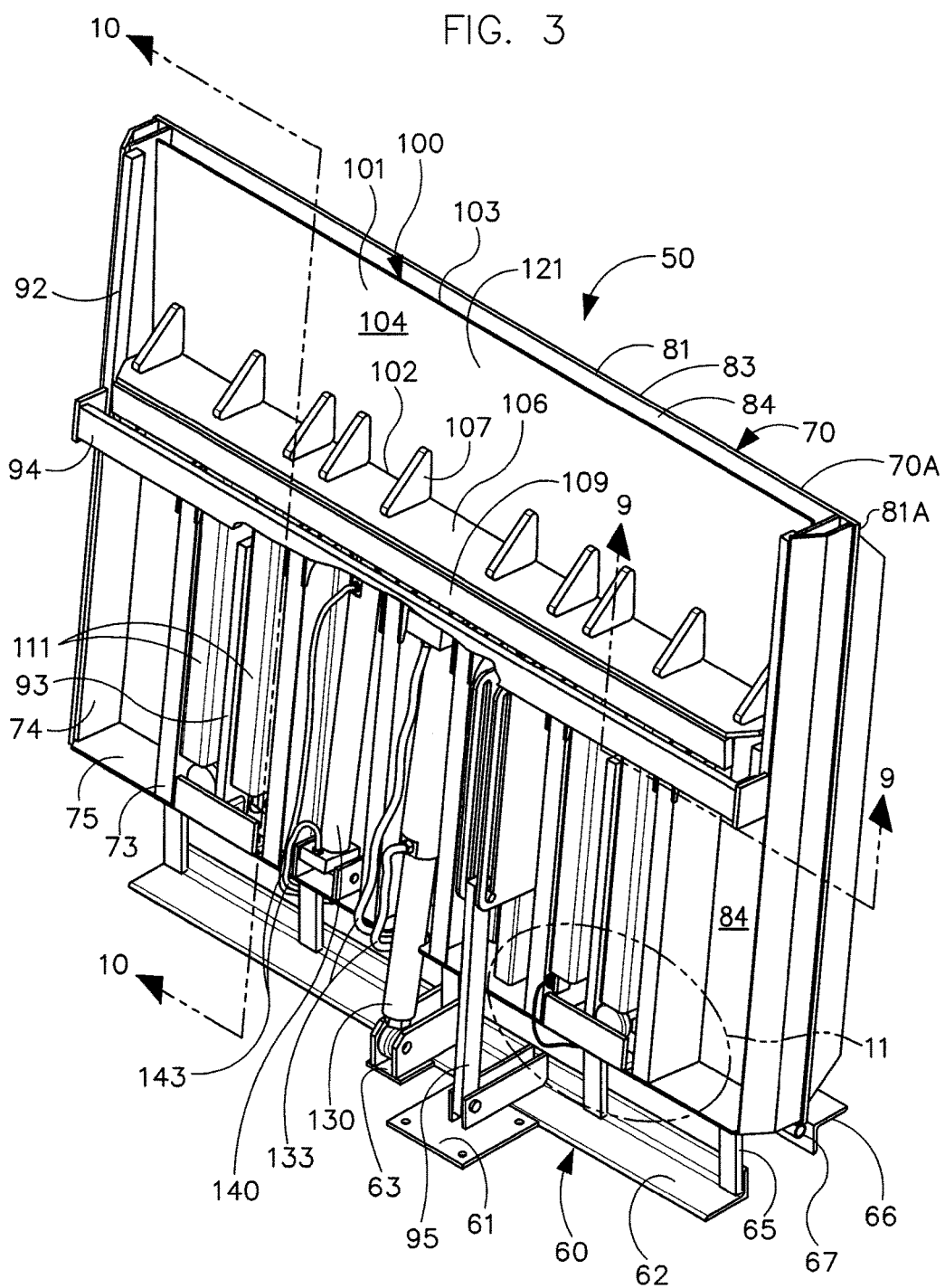
FIG. 3 is a perspective view of the underside of the present vertically stored dock leveler in its raised vertical storage position with the lip retracted.
Figure 4:
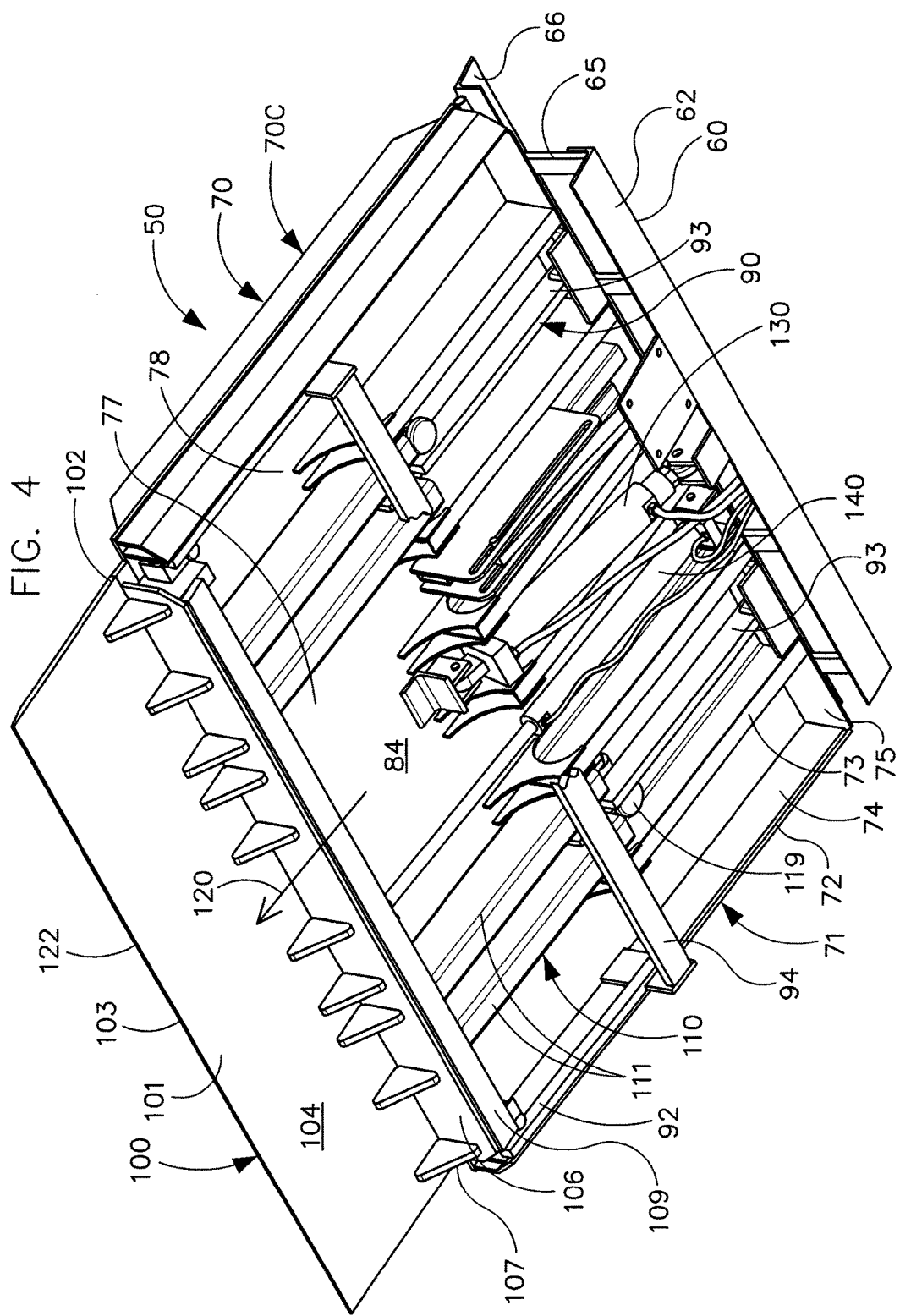
FIG. 4 is a perspective view of the underside of the present vertically stored dock leveler in a lowered position with the lip extended.

The deck and lip assembly 70 includes a deck assembly 71 and a telescoping lip assembly 100 as best shown in FIGS. 3 and 4. The deck assembly 71 includes a deck frame 72, lip retaining area 77, deck 80 and lip support carriage 90. The entire deck and lip assembly 70 is movable through a range of inclined positions as discussed below. The deck support frame 72 has six relatively evenly spaced, parallel beams 73 and side plates 74 that are welded or otherwise rigidly joined together by a rear plate 75. The deck support beams 73 extend forward about ⅔ the length of the deck 80 to the rear end 78 of the lip retaining area 77. The beams 73 do not extend into the lip retaining area 77. The front end of each beam 73 is welded or otherwise rigidly secured to the underside 84 of the deck 80 via two gussets. The top of the outside or rear surface of the rear plate 75 is firmly and pivotally secured to the hinge 67 at the top of the support frame risers 65 and upper mounting channel 66. The side plates 74 include a pinch guard 79.

The deck 80 is preferably formed from a sheet or plate of metal 81. The deck plate 81 has a predetermined length of preferably about 5 to 7 feet between its parallel rear and front ends 82 and 83. The rear end 82 is flushly aligned with the rear plate 75, and its front end 83 extends beyond the support beams 73. The deck plate 81 has a predetermined width between its outermost side edges 81a, and a thickness defined by its parallel lower and upper surfaces 84 and 85. The lower surface 84 is welded or otherwise rigidly secured to the frame 72, and its upper surface 85 is generally flat and free and clear of obstructions. Side guards 86 are fixed to the sides of the deck plate 81. The deck and lip assembly 70 is pivotally secured to hinge 67 so that the upper surface 85 of the deck plate 81 is aligned parallel to the dock floor 6 when the deck 80 is lowered.

The lip carriage 90 includes two support and guide rails 92. One rail 92 is secured to the inside surface of each side plate 74 of the deck frame 72. Each elongated rail 92 has a generally linear shape and is about two feet long. The rails 92 have a uniform rectangular cross-sectional shape along their length, to provide flat upper and inner surfaces. The upper surface of each rail 92 is uniformly spaced downwardly from and roughly parallel to the deck plate 81. The carriage assembly 90 also includes two guide tracks 93. Each guide track or roller trap 93 extends forward from the rear header plate 75. Its rear end is bolted to plate 75, and its front end is bolted to a bracket welded to the underside 84 of the deck plate 81. The lip support and guide assembly or carriage 90 also includes a crossbar 94. The crossbar 94 spans the width of the deck 80 and is welded or otherwise rigidly secured to the lower ends of the deck frame side plates 74. The crossbar 94 is spaced a predetermined distance from the deck plate 81 to accommodate the telescoping lip assembly 100 as discussed below. The crossbar 94 is located forward of the rear header plate 75 about ⅔ the length of the deck 80. The crossbar 94 adds lateral stiffness to prevent roller binding.

The deck assembly 71 has a position sensor 87 that senses the angle or degree of incline of the deck 80. The incline sensor 87 is placed in an out of the way location on the deck frame 72 or deck, such as on the side of one of the support beams 73 under the deck 80. The sensor 87 is preferably a Hall Effect sensor that sends a digital signal. The sensor 87 works in unison with a magnet 87. The sensor 87 and magnet 88 are used to detect when the lip assembly 100 has returned to its retracted position 121. The sensor 87 is in electrical communication with the dock leveler control systems 150 via a wire 89 as discussed below.

The deck assembly 71 includes a maintenance lock mechanism 95 toward its rear end 82. The lock mechanism 95 includes two parallel slotted plates 96 rigidly secured to the deck frame 72, and a safety bar 97 pivotally secured to the mounting frame 61. The safety bar 97 includes a locking strut 98 that travels in the slots o plates 96. The vertically stored leveler 50 is locked into its vertical position by inserting a pin (not shown) that locks the leveler into its vertical position 70A so that maintenance can be safely performed.

Figure 5:
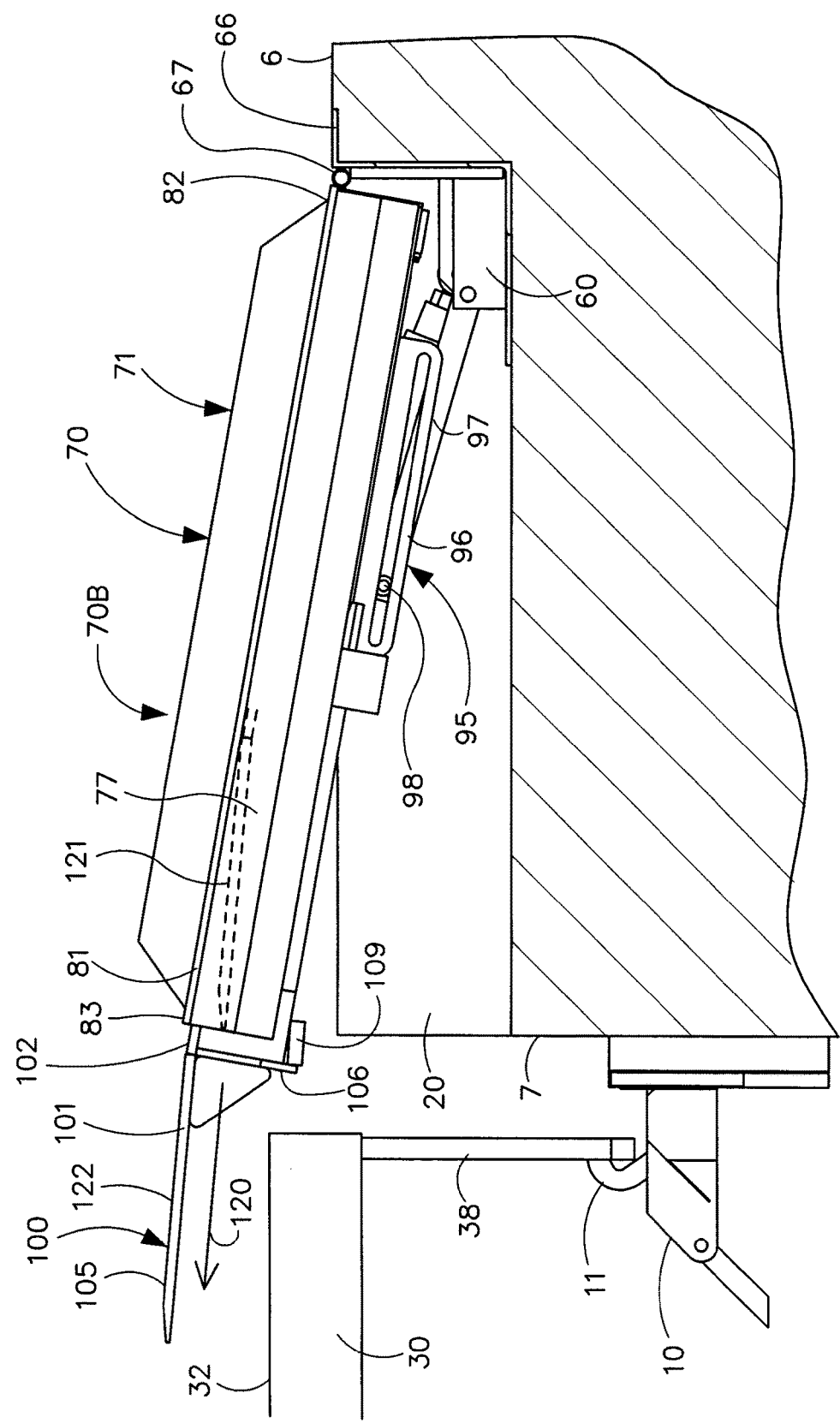
FIG. 5 is a side view showing the dock leveler lowered to a lip extending position where the retracted lip moves to its fully extended position.
Figure 6:
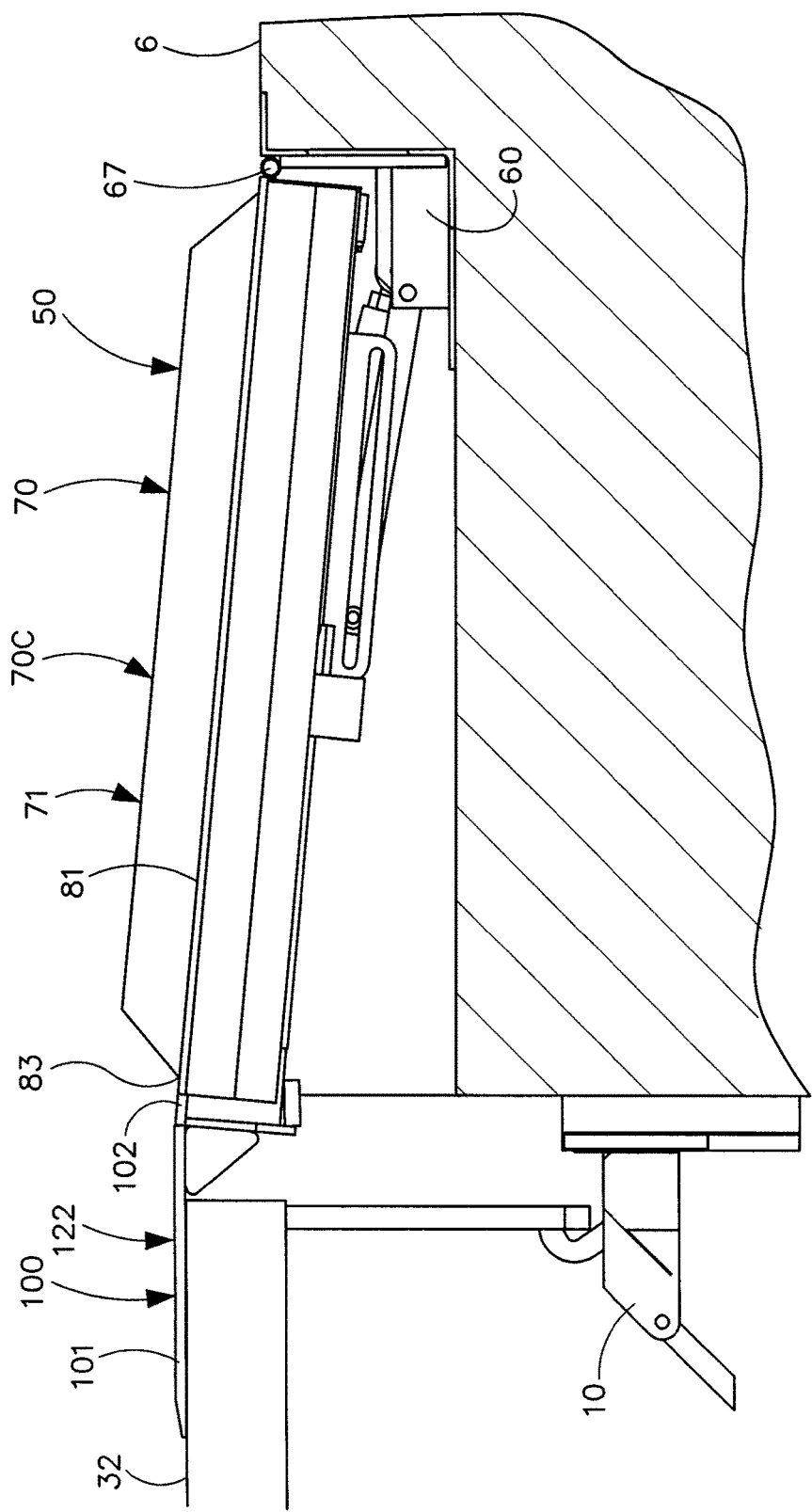
FIG. 6 is a side view showing the dock leveler with its fully extended lip lowered into engagement with the trailer bed.

The telescoping lip assembly 100 has a lip plate 101, header plate 106 and lugs 107. The lip plate 101 has a generally rectangular shape. Its length is defined by its parallel inner end 102 and its outer or free end 103. Its width is defined by its parallel side edges. The side edges of the lip plate 101 are in substantial registry or alignment with side edges 81a of the deck 80, and are received between and slightly inwardly offset from the side plates 74 of the deck frame 72. The lip plate 101 has a predetermined thickness defined by its generally parallel lower and upper surfaces 104 and 105. The upper surface 105 of the free end 103 is beveled or slightly sloped toward the lower surface 104. The inner end 102 of the lip plate 101 is joined to the top of its headboard or header plate 106. This connection is strengthened by a number of lugs 107 welded to the lower surface 104 of the lip plate 101 and front of its header plate 106. The header plate 106 is held substantially perpendicular to the deck plate 81. Each lug 107 forms an 85° angle to hold the lip plate 101 at an 85° angle relative to its header plate 106, so that the lip plate is at a 5° downward angle relative to the deck plate 81. The lip plate 101 is preferably downwardly sloped 5° relative to the deck plate 81 to facilitate engagement with a trailer bed 32 when the trailer bed is elevated slightly above the dock floor 6 as shown in FIGS. 5 and 6.

The lip assembly 100 has guide and support components 110 to telescopically join it to the deck frame 72 and support carriage 90 to allow its linear movement. These guide and support components 110 include two sets of lip guide beams 111. One set of guide beams 111 is located on each side of the deck 80. Each set included two uniformly spaced guide beams 111. Each elongated lip beam 111 is linear shape and has a preferably tubular shape for strength. Each beam 111 is welded or otherwise rigidly secured to the rear surface of the lip header plate 106, and extends perpendicular to the header plate 106. Each set of beams 111 straddle one of the lip guide tracks 93 of the lip support and guide carriage 90. The guide tracks 93 and beams 111 are linearly aligned. The upper surface of each beam 111 is planar to and spaced about ⅛ inch from the underside 104 of the lip plate 101. The upper surface of each track 93 is planar to and spaced about 2½ inches from the underside 104 of the lip plate 101.

The lip guide and support components 110 include several rollers to movingly support and smoothly guide the telescoping lip assembly 100. Each side of the lip header plate 106 has a rigidly secured mounting block 113. Each mounting block 113 rotatably holds a vertically aligned roller 114 that rollingly engages the upper surface of its corresponding guide rail 92 to movingly support the weight of the lip assembly 100. These weight-bearing rollers 114 ride on the guide rails 92 to support the majority of the weight of the lip assembly 100, and transfer that weight to the deck frame 72 via the guide rails 92 of the support carriage 90. Each mounting block 113 also rotatably holds a horizontally aligned roller 115 that rollingly engages the side surface of its corresponding guide rail 92 to maintain the registered alignment of the lip plate 101 with the deck plate 81. The alignment rollers 115 also maintain the engagement of the weight bearing rollers 114 with the lip guide rails 92. A first set of two rear brackets 116 rotatably hold third or weight-bearing yoke rollers 117. The bracket 116 is secured toward the end of two adjacent guide beams 111 and straddles the guide track 93. Each yoke roller 117 rides on the upper surface of the guide track 93 to help movingly support the weight of the lip assembly 100. A second set of two rear bracket 118 rotatably hold fourth or alignment rollers 119. The bracket 118 is rigidly secured to the rear end of at least one guide beam 111 in each set of the two sets of guide beams. Each guide roller 119 rollingly engages the side surface of its corresponding guide track 93 to further maintain the registered alignment of the lip plate 101 with the deck plate 81.

The guide and support components 110 are telescopically secured to the deck frame 72 by the support carriage 90. The lip guide and support components 110 allow the lip assembly 100 and lip plate 101 to move along a substantially linear path of travel 120 between a retracted position 121 in the lip retaining area 77 as in FIGS. 1-4 and a fully extended position 122 out of the lip retaining area 77 as in FIGS. 5-7. When fully extended 122, the rear or inner end 102 of the lip plate 101 is just forward of and in linear alignment with the front end 83 of the deck plate 81. The lip assembly 100 and lip plate 101 are also movable to any desired partially extended position 123 through a continuous range of partially extended positions, such as for end loading of a trailer as in FIG. 8.

When in its retracted or stored position 121 as in FIG. 3, the free end 103 of the lip plate 101 is in substantial registry with the front end 83 of the deck plate 81. When the lip assembly 100 is in its retracted 121, fully extended 122 or partially extended 123 positions as shown in FIGS. 3, 5 and 8, respectively, the upper surface 105 of the rear end 102 of the lip plate 101 is slightly downwardly offset from the upper surface 85 of the deck plate 81. The amount of the offset is slightly more than the thickness of the deck plate 81. The amount of offset at front end 103 of the lip plate 101 is slightly more given its 5° angle relative to the deck plate 81 as best shown in FIG. 5. When fully extended 112 and lowered into engagement with the trailer bed 32, the lip plate 101 shifts or rises slightly upward relative to the deck 80 to eliminate the offset between the lip plate 101 and the deck plate 81, so that their upper surfaces 85 and 105 are flush as in FIGS. 6 and 7. To perform an end load after the lip plate 101 has been resting on the trailer bed 32, the deck 80 must be raised a slight amount equal to the above noted offset to allow the lip plate 101 to retract underneath the deck plate 81.

The lip support carriage 90 and lip assembly 100 are designed to help support the front end 83 of the deck 81 when the lip is extended 122 or 123 to load a trailer 30. When fully extended 112 and lowered into engagement with the trailer bed 32 as in FIGS. 6 and 7, the rectangular lip guide beams 111 engage and support the front end 83 of the deck plate 81. The guide beams 111 are supported by the deck frame 72 and lip carriage 90. The beams 111 are welded to the lip headboard 106, which is supported by the guide rails 92 of the carriage 90. When the lip plate 101 is only partially extended for end loading as in FIG. 8, the lip plate 101 also provides support to the deck 81 further back from its front end 83. When in its vertically stored position 70A as in FIGS. 1-3, the lip assembly 100 rests on the gussets at the front end of the deck support beams 73. The gussets are best shown in FIG. 4.

Figure 12:
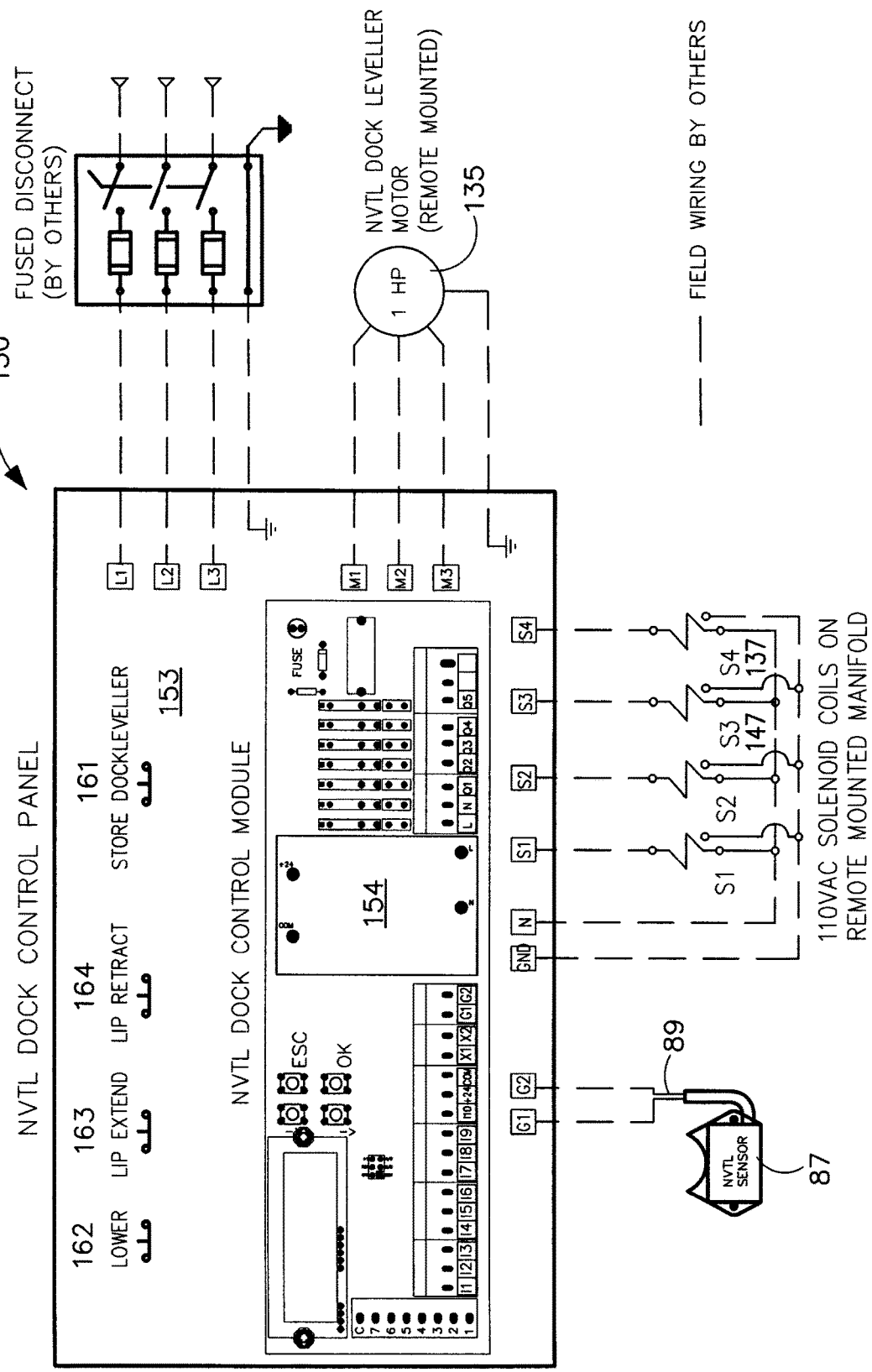
FIG. 12 is an electric schematic of the vertically stored leveler with telescoping lip.
Figure 13:
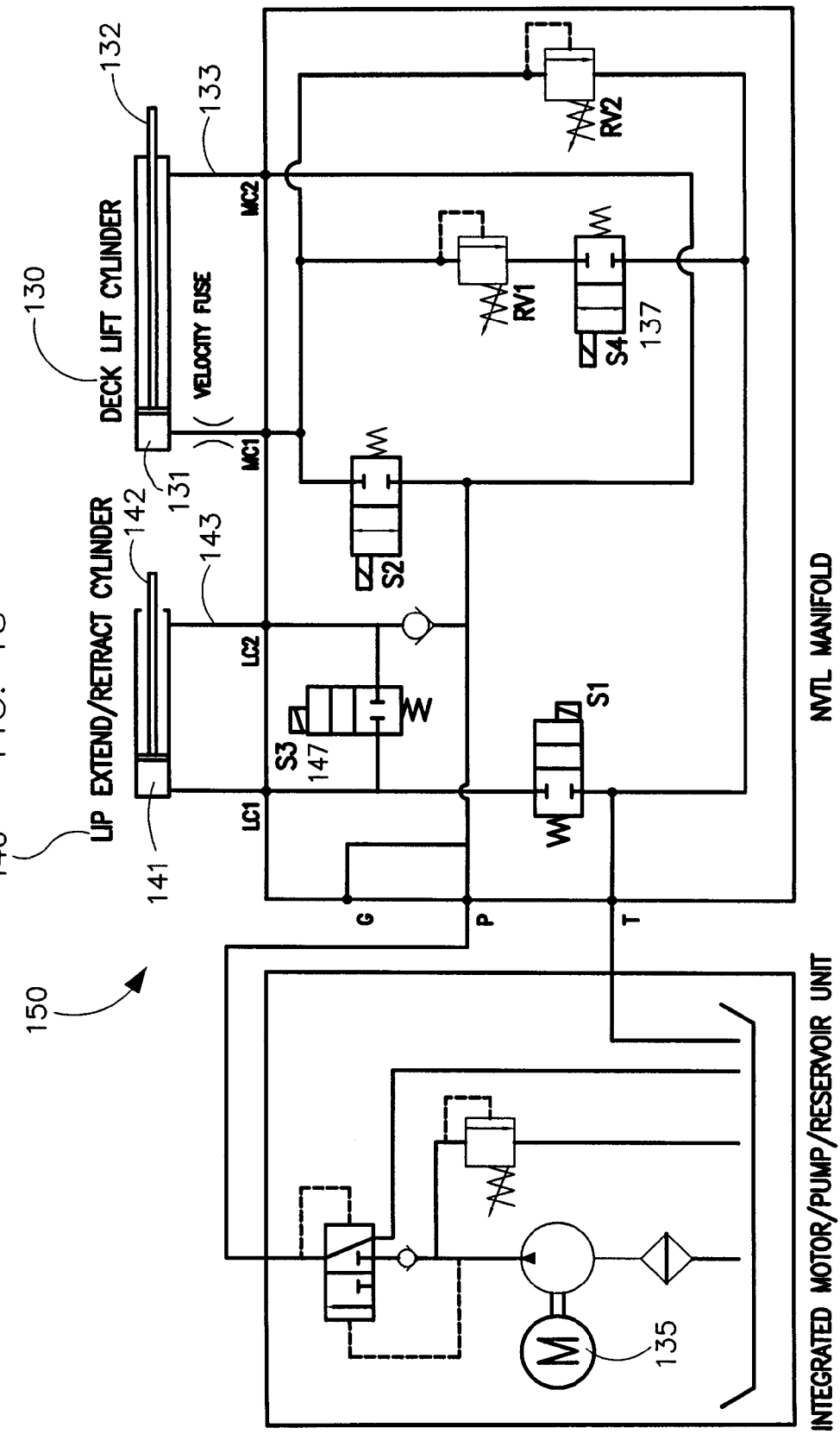
FIG. 13 is a hydraulic schematic of the vertically stored leveler with telescoping lip.

The deck positioning mechanism 130 is shown in FIGS. 3 and 4 and illustrated in FIGS. 12 and 13. The deck positioning mechanism 130 selectively raises and lowers the deck and lip assembly 70 through a range of positions 70A-D as shown in FIGS. 3-8. The deck positioning mechanism 130 is preferably hydraulic, and includes a conventional drive cylinder 131, drive rod 132, intake and outlet hoses 133, hydraulic pump 135 and solenoid valve 137. One end of the hydraulic cylinder 131 is pivotally pinned to a bracket welded to the underside 84 of the deck plate 81. The drive rod 132 is pinned to the mounting bracket 63 of the base frame 61. The cylinder 131 extends and retracts its drive rod 132 to selectively rotate the deck and lip assembly 70 through its incline positions 70A-D by pivoting it up or down about hinge 67.

Figure 2:
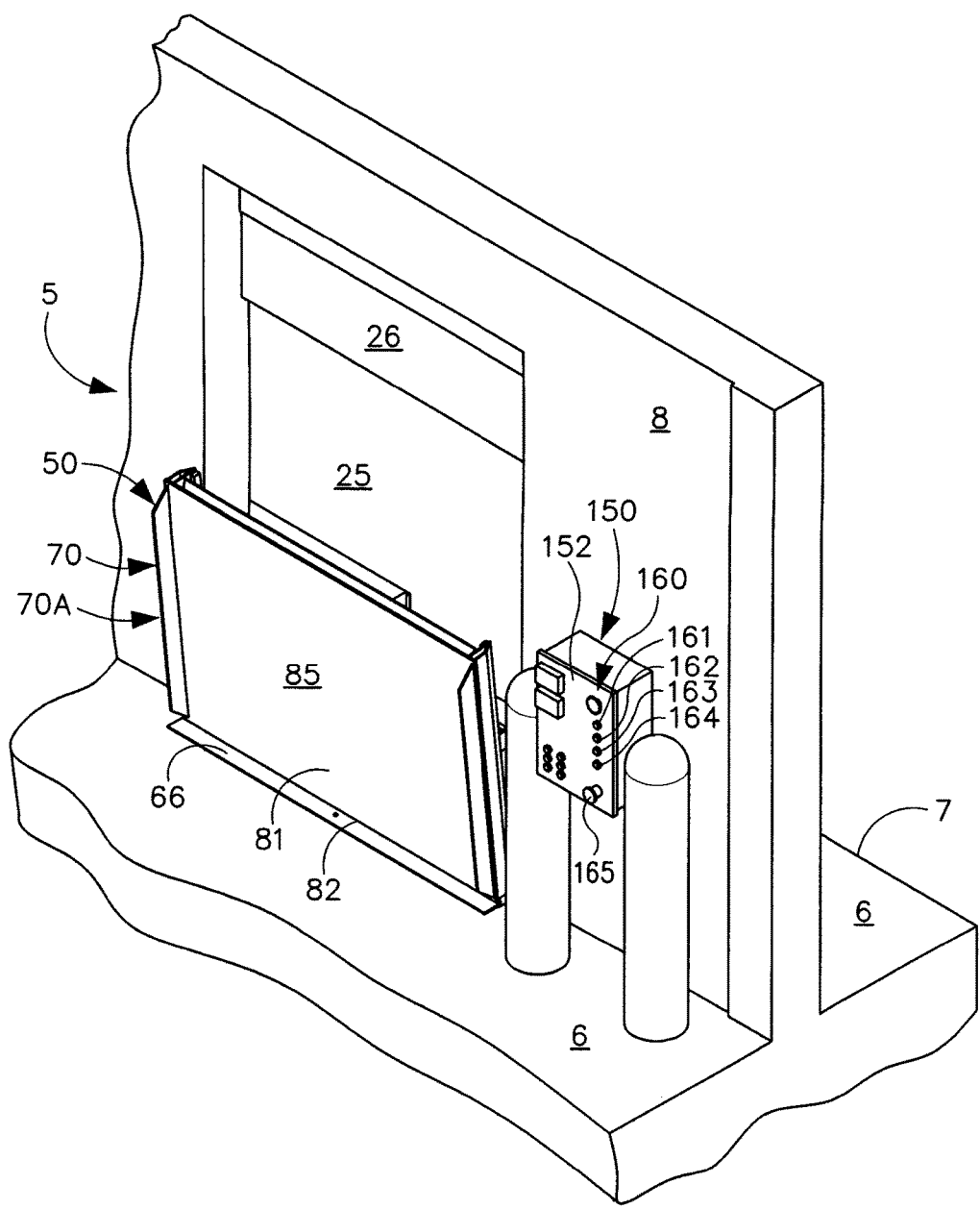
FIG. 2 is a perspective view of the inside of a loading dock building equipped with the present vertically stored dock leveler.
Figure 7:
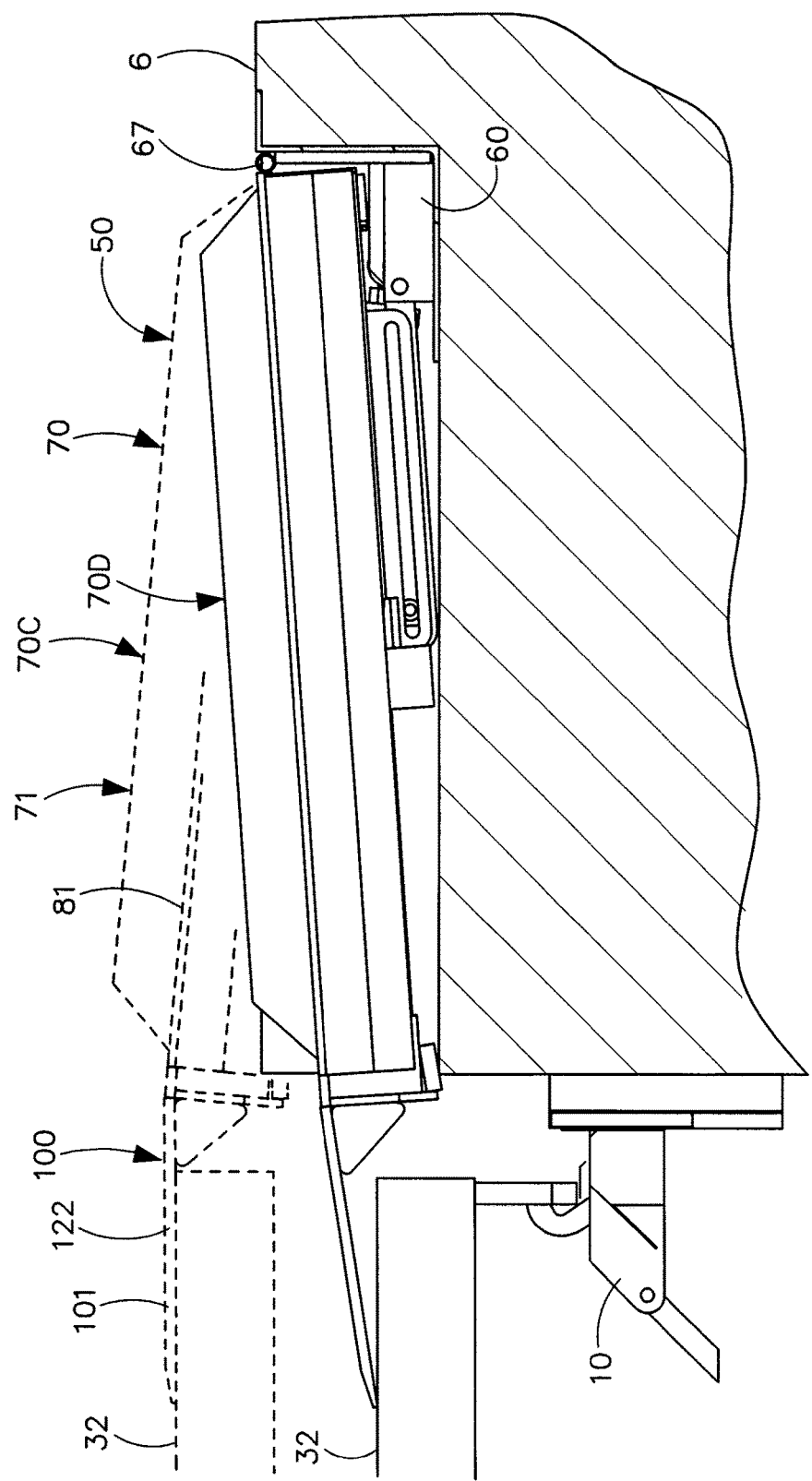
FIG. 7 is a side view showing the range of motion of the dock leveler with its fully extended lip is engaged with a trailer bed.
Figure 8:
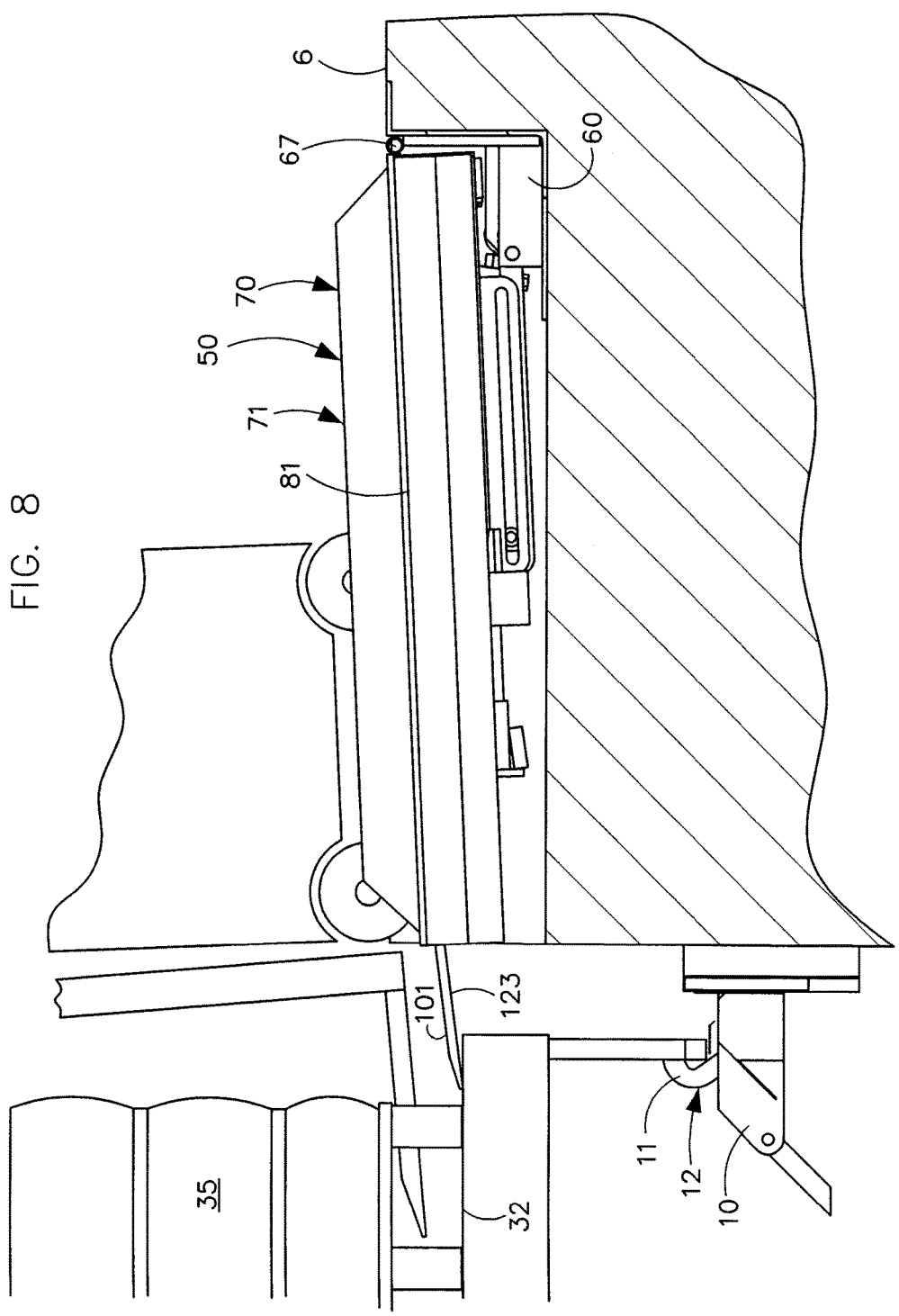
FIG. 8 is a side view showing the dock leveler with the lip partially retracted to facilitate trailer end loading.
Figure 9:
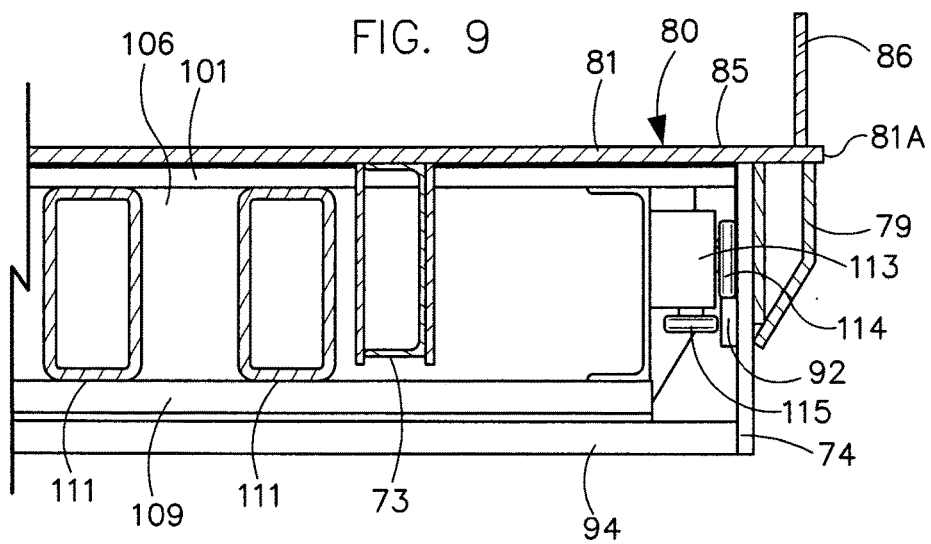
FIG. 9 is a sectional view taken along line 9-9 of FIG. 3 showing the guide carriage of the deck frame for holding and guiding the lip assembly.
Figure 10:
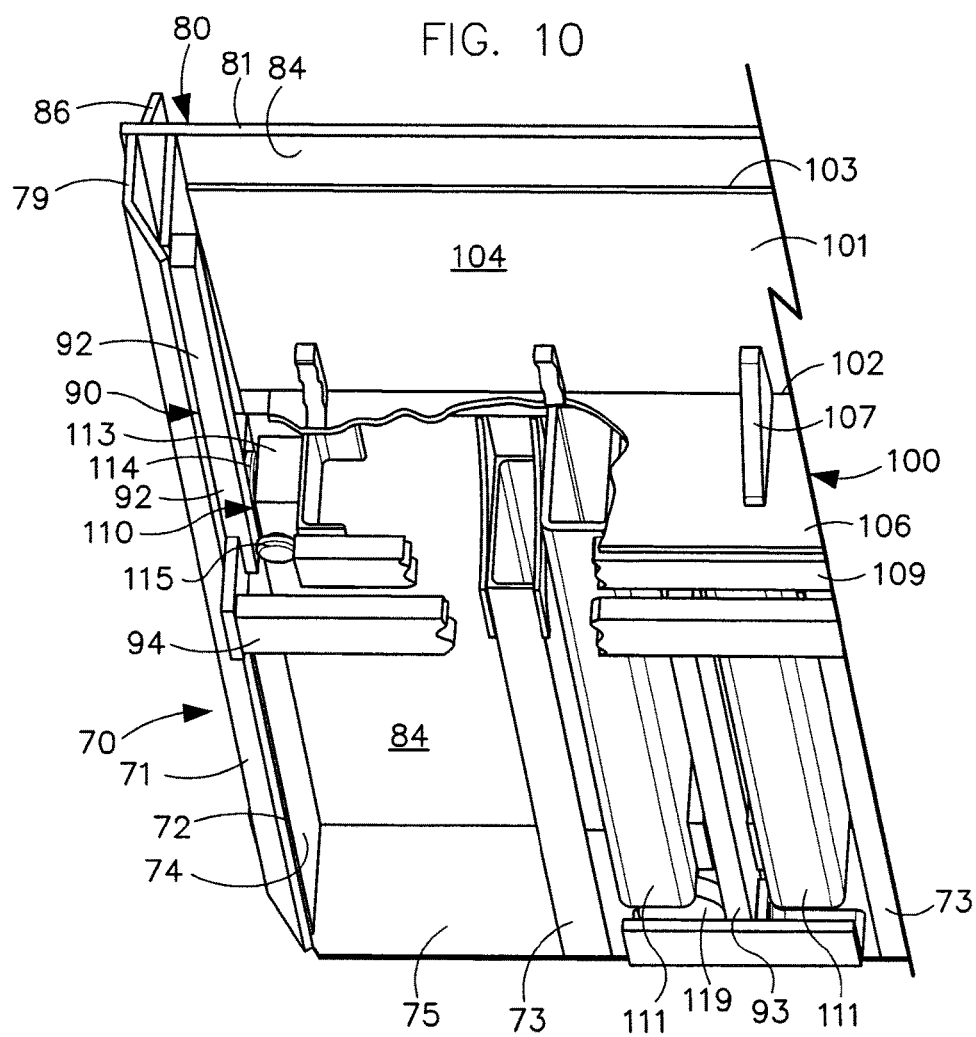
FIG. 10 is a partial perspective view taken along line 10-10 of FIG. 3 showing the guide carriage of the deck frame for supporting and guiding the lip assembly.
Figure 11:
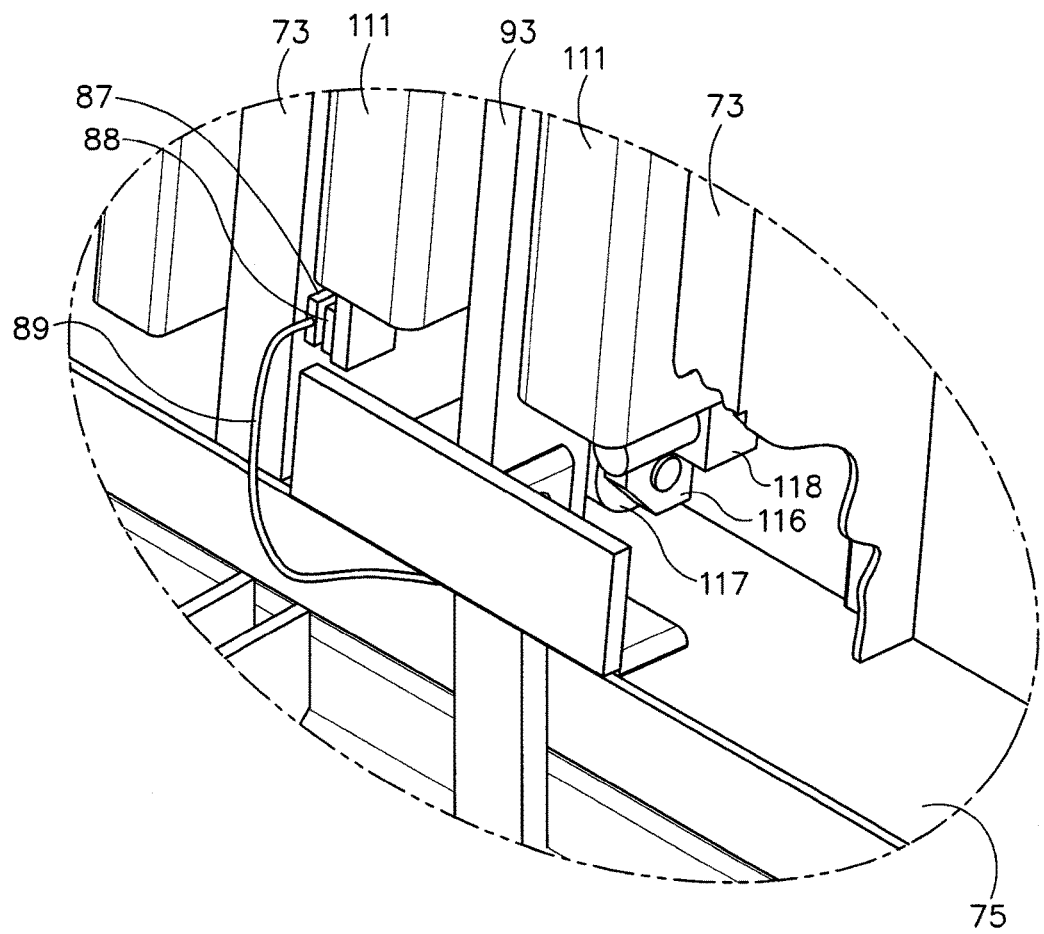
FIG. 11 is an enlarged view of the position sensor and magnet shown in FIG. 3 with a portion cut away to show the yoke roller riding on the guide track.

During operation, the deck positioning mechanism 130 sequentially moves the deck and lip assembly 70 from a vertically stored position 70A as in FIGS. 1-3, down to a partially lowered lip extending position 70B as in FIGS. 4 and 5, and further down into engagement with the trailer bed 32 through a range of trailer engaging positions 70C-D as in FIGS. 6 and 7. The range of trailer engaging positions including upper position 70C and lower position 70D.

The lip extension mechanism 140 is shown and illustrated in FIGS. 3, 4, 12 and 13. The lip positioning mechanism 140 extends and retracts the lip assembly 100 and lip plate 101 when the leveler 50 reaches a preset angular position 70B as shown in FIG. 5. The lip extension mechanism 140 is preferably hydraulic, and includes a drive cylinder 141, drive rod 142, intake and outlet hoses 143 and solenoid valve 147. The mechanism 140 shares the hydraulic pump 135 of the deck positioning mechanism 130. The lip drive rod 142 has a predetermined length of about two feet. One end of the hydraulic cylinder 141 is pivotally pinned to a bracket secured to the rear header 75 of the deck frame 72. The drive rod 142 is pinned to a bracket secured to the rear header 106 of the lip assembly 100. When the lip drive 140 is engaged, the lip drive rod 142 pushes or pulls the lip assembly 100 along its linear path of travel 100 into its retracted, fully extended or partially extended positions 121-123.

During operation, the lip extension mechanism 140 selectively moves the lip 101 to its retracted position 121 when the lip is inclined above set position 70B as in FIGS. 1-3. The lip extension mechanism 140 also moves the lip 101 to its extended position 122 when the lip is inclined at or below set position 70B as in FIGS. 4-7. The lip extension mechanism 140 also selectively moves the lip 101 to its partially position 123 to perform trailer end loading.

A control system 150 is provided to allow the dock workers to easily control the operation of the leveler 50. The control system 150 includes a control panel 152 located inside the loading dock building 8 as shown in FIGS. 2, 12 and 13. The control panel 152 includes a circuit board 153 in electrical communication with a programmed central processing unit (CPU) 154 and a number of dock leveler controls 160. The controls 160 include an on/off switch (not shown) and a number of push buttons 161-164. The on/off switch activates the control system 160, including the motor 135 to compress hydraulic fluid that will flow through hydraulic lines 133 to the deck drive cylinder 131 and hydraulic lines 143 to lip drive cylinder 141.

During operation, to return the leveler 50 to its vertically stored position 70A as in FIG. 3, the dock worker engages and releases the first button 161. This causes the CPU 154 to place the deck lift solenoid valve 137 in a state that extends the deck drive rod 132 and raises the deck 80 toward position 70B as in FIG. 5. When the deck 80 reaches this incline position 70B as detected by position sensor 87, the CPU 154 places the lip solenoid valve 147 in a state that retracts lip drive rod 142 and lip 101. The CPU 154 then moves the leveler 50 to its stored position 70A. When the leveler 50 is vertically stored 70A, and a dock worker engages and holds the second button 162, the CPU 154 places the deck lift solenoid valve 137 in a state that retracts deck drive rode 132 and lowers the deck 80 to position 70B. When position sensor 87 detects that the deck has reached this inclined position 70B, the CPU 154 places the lip solenoid valve 147 in a state that extends the lip drive rod 142 and the lip 101 as in FIGS. 12 and 13. The CPU 154 then continues to retract deck drive rod 132 to lower the deck until the lip 101 engages the bed 32 of a trailer 30 parked in the loading bay 5 as in FIGS. 6 and 7. Engaging and holding a third button 163 caused the CPU 154 to place the lip solenoid valve 147 in a state that extends the lip drive rod 142 and lip 101 to either partially or fully extend the lip 101 depending on when the button 163 is released. Similarly, engaging and holding a fourth button 164 caused the CPU 154 to place the lip solenoid valve 147 in a state that retracts the lip drive rod 142 and lip 101 either partially or fully depending on when the button 164 is released.

While the invention has been described with reference to a preferred embodiment, it will be understood by those skilled in the art that various changes may be made and equivalents may be substituted without departing from the broader aspects of the invention.

I claim:

1. A vertically stored telescoping lip leveler for forming a bridge between a floor of a loading dock and a trailer bed, the loading dock having a pit, said vertically stored telescoping lip leveler comprising:
   a mounting frame secured to the pit of the loading dock;
   a deck assembly including a deck plate, front and hinged ends, outermost side edges, deck frame, lip retaining area and lip support carriage, said deck frame having a plurality of deck beams and side plates positioned under said deck plate, said side plates extending downwardly proximal to said outermost side edges, said deck beams extending from proximal said hinged end toward said front end and terminating before said lip retaining area, and said side plates extending from proximal said hinged end to proximal said front end, said lip support carriage having a lip guide rail secured to each of said side plates, each of said lip guide rails extending along said lip retaining area under said deck plate, said hinged end being pivotally secured to said mounting frame, said lip retaining area being proximal said front end, and said deck assembly being movable through a range of inclined positions including a substantially vertically stored position, a preset incline position and a trailer engaging position, said deck assembly including a position sensor that senses a degree of incline of said deck assembly;

a telescoping lip assembly including a lip plate with inner and outer ends, said telescoping lip assembly supportingly riding on said lip guide rails, said lip plate being movable between retracted and extended positions including a continuous range of partially extended positions, said lip plate being in said lip retaining area and downwardly offset from said deck plate when in said retracted and partially extended positions, said inner end of said lip plate being in forward alignment with said front end of said deck plate when in said extended position, and said lip plate being substantially flush with said deck plate when in said extended position and resting on the trailer bed;

a deck positioning mechanism secured between said mounting frame and said deck assembly, said deck positioning mechanism including a deck drive rod and deck solenoid valve to selectively move said deck assembly through said range of incline positions;

a lip positioning mechanism secured between said deck assembly and said lip assembly, said lip positioning mechanism including a lip drive rod and lip solenoid valve to selectively move said lip assembly between said retracted and extended positions, including said continuous range of partially extended positions; and, a control panel with a programmed CPU in communication with said position sensor, said CPU being programmed to place said lip solenoid valve in a state to extend said lip drive rod and said lip from said retracted position to said extended position when said deck assembly is being lowered and said position sensor senses said deck assembly has reached said preset incline position, and said CPU being programmed to place said lip solenoid valve in a state to retract said lip drive rod and said lip from said extended position to said retracted position when said deck assembly is being raised and said position sensor senses said deck assembly has reached said preset incline position.

2. The vertically stored telescoping lip leveler of claim 1, and wherein said control panel includes a circuit board in electrical communication with said central processing unit and a number of dock leveler controls.

3. The vertically stored telescoping lip leveler of claim 2, and wherein said dock leveler controls include first and second buttons, said first button being selectively engaged to place said deck solenoid valve in a state to extend said deck drive rod and raise said deck assembly toward said preset incline position, said CPU being programmed to retract said lip when said deck assembly reaches said preset incline position and said deck assembly continuing to raise to said vertically stored position, and said second button being selectively engaged to place said deck solenoid valve in a state to retract said deck drive rod and lower said deck assembly toward said preset incline position, said CPU extending said lip when said deck assembly reaches said preset incline position and said deck assembly continuing to lower said deck assembly until said lip engages a bed of a trailer at a trailer engaging position.

4. The vertically stored telescoping lip leveler of claim 3, and wherein said dock leveler controls include third and fourth buttons, said third button being selectively engaged to place said lip solenoid valve in a state to extend said lip drive rod and lip plate, and said fourth button being selectively engaged to place said lip solenoid valve in a state to retract said lip drive rod and lip plate.

5. The vertically stored telescoping lip leveler of claim 1, and wherein said position sensor sends a digital signal to said CPU.

6. The vertically stored telescoping lip leveler of claim 5, and wherein said position sensor is in electrical communication with said CPU via a wire.

7. The vertically stored telescoping lip leveler of claim 6, and wherein the position sensor is a Hall Effect sensor.

8. The vertically stored telescoping lip leveler of claim 7, and wherein said sensor works in unison with a magnet to detect when said lip has returned to its said retracted position.

* * * * *